United States Patent [19]

Bentley et al.

[11] Patent Number: 5,363,252
[45] Date of Patent: Nov. 8, 1994

[54] METHOD AND SYSTEM FOR TRACK SKEW TOLERANT ACQUISTION BURST SEQUENCE VALIDATION IN A DATA STORAGE SYSTEM

[75] Inventors: Steven R. Bentley; Sushama M. Paranjape; Rickey W. Murray, all of Tucson, Ariz.

[73] Assignee: International Business Machines Corporation, Armonk, N.Y.

[21] Appl. No.: 85,518

[22] Filed: Jun. 30, 1993

[51] Int. Cl.$^5$ .................................. G11B 5/09
[52] U.S. Cl. ........................... 360/53; 360/51
[58] Field of Search ............. 360/53, 46, 31, 48, 360/50, 51, 77, 78, 72.2; 331/16; 395/250, 275, 325, 650

[56] References Cited

U.S. PATENT DOCUMENTS

| | | | |
|---|---|---|---|
| Re. 28,265 | 12/1974 | Irwin | 360/50 |
| 4,081,844 | 3/1978 | Devore et al. | 360/48 |
| 4,393,445 | 7/1983 | Milligan et al. | 360/72.2 |
| 4,403,286 | 9/1983 | Fry et al. | 395/650 |
| 4,423,480 | 12/1983 | Bauer et al. | 395/325 |
| 4,435,762 | 3/1984 | Milligan et al. | 395/250 |
| 4,471,457 | 9/1984 | Videki, II | 395/275 |
| 4,472,750 | 9/1984 | Klumpp et al. | 360/78 |
| 4,530,019 | 7/1985 | Penniman | 360/77 |
| 4,586,094 | 4/1986 | Chambors et al. | 360/77 |
| 4,603,382 | 7/1986 | Cole et al. | 395/250 |
| 4,669,004 | 5/1987 | Moon et al. | 360/77 |
| 4,717,973 | 1/1988 | McWhirter | 360/31 |
| 4,757,406 | 7/1988 | Stewart et al. | 360/51 |
| 4,783,705 | 11/1988 | Moon et al. | 360/77 |
| 4,942,484 | 7/1990 | Nigam | 360/46 |
| 4,954,788 | 9/1990 | Leis et al. | 331/16 |

OTHER PUBLICATIONS

IBM Technical Disc. Bulletin vol. 11 No. 2, Jul. 1968, G. L. Yakkel, Jr. "Reading Phase-Encoded Data".

Primary Examiner—John Shepperd
Assistant Examiner—Patrick Wamsley
Attorney, Agent, or Firm—D. A. Shifrin; Andrew J. Dillon

[57] ABSTRACT

A method and system for detecting and validating multibit acquisition burst sequences which precede and follow each data block in a multitrack data storage system. An acquisition sequence pattern detection circuit is utilized to provide an indication of acquisition burst sequence detection in response to an occurrence of an accurate sequence of a selected number of acquisition burst sequence bits. A latch is utilized to store the pattern criteria indication for each associated track and the latch outputs are then combined in a logic circuit to provide a composite burst pattern error indication signal. An acquisition burst sequence quality detection circuit is also utilized to provide a quality criteria indication for each track in response to an occurrence of an accurate sequence of a larger number of acquisition burst sequence bits than is normally required for acquisition which ensures that subsequent detection of the acquisition burst sequence will be successful, despite increased skew among the multiple tracks. An occurrence of an acquisition burst sequence is then validated during selected modes of operation only in response to a detection of an acquisition burst sequence and an indication of sufficient quality of the acquisition burst sequence within a predetermined number of tracks.

9 Claims, 8 Drawing Sheets

METHOD AND SYSTEM FOR TRACK SKEW TOLERANT ACQUISTION BURST SEQUENCE VALIDATION IN A DATA STORAGE SYSTEM

BACKGROUND OF THE INVENTION

1. Technical Field

The present invention relates in general to an improved data storage system and in particular to an improved method and system for validation of an acquisition burst sequence which precedes or follows a data block in a data storage system. Still more particularly, the present invention relates to an improved method and system for detection and validation of an acquisition burst sequence which is tolerant of increased track skew.

2. Description of the Related Art

Modern data processing systems often use digital signal recording devices attached to host processors to record records as addressable units within magnetic tape storage systems.

Examples of systems which may be utilized to record records within a magnetic tape storage system are disclosed within Milligan et al., U.S. Pat. No. 4,393,445; Milligan et al., U.S. Pat. No. 4,435,762; Videki II, U.S. Pat. No. 4,471,457; Cole et al., U.S. Pat. No. 4,603,382; Bauer et al., U.S. Pat. No. 4,423,480; and Fry et al., U.S. Pat. No. 4,403,286. Each of the aforementioned patents discloses a magnetic tape storage system which may be advantageously employed in carrying out the method and system of the present invention.

In such data storage systems, it is practically a necessity that each track of data within the recording medium includes multiple synchronization characters. Such synchronization characters are necessary so that the data may be considered self-synchronizing. Without such self-synchronizing, data may not be successfully recovered. This self-synchronizing is typically accomplished by inserting various synchronization characters between small blocks or sets of data signals so that the data stored therein may be accurately and efficiently recovered.

In modern data storage systems, data are typically written to multiple tracks simultaneously. When such multiple track recording is utilized, it is possible to determine various necessary parameters which may affect data recovery, even though individual track data within a group of multiple tracks may be lost. One such parameter is the ending or beginning of a data block within a plurality of data blocks. Typically, an interblock gap character is written between adjacent data blocks and an acquisition burst sequence is then written immediately following and preceding each interblock gap.

The acquisition burst sequence typically comprises the highest frequency pattern permissible within the Run-Length-Limited (RLL) code which is employed in a particular system and such acquisition burst sequences then make up the first and last portion of each formatted data block. The acquisition burst sequence is utilized to provide a constant stream of pulses from the read detector to clock acquisition circuits during a Read-While-Write (RWW) or a Read Forward operation. Once the track logic detects a transition from an interblock gap to an acquisition burst sequence, a Phase-Locked-Loop (PLL) circuit may be placed in an acquisition mode for a predetermined period of time in order to permit a system clock to lock onto the frequency of the data pulses.

In bidirectional data storage systems, the ending burst sequence is typically the reverse of the acquisition burst sequence and is utilized for the same function as the acquisition burst sequence during a Read Backward operation. It should therefore be apparent that the integrity of the acquisition burst sequence pattern during the time a Phase-Locked-Loop (PLL) circuit is in an acquisition mode is highly important to the ability of a system clock to correctly lock onto an incoming signal. If one or more tracks within a multitrack system fail to detect a valid acquisition burst sequence pattern during this short interval there exists the possibility that the clock may not acquire frequency synchronization and the data flow will not correctly detect beginning synchronization signals which follow the acquisition burst sequence.

This problem becomes increasingly difficult in storage formats which permit large track skew across a tape and which employ a global clock derived from the outputs of multiple tracks. As skew increases as a result of interchange of storage media, the portion of the acquisition burst sequence which is utilized to acquire a lock for the Phase-Locked-Loop circuit when written will not be identical to that utilized in a subsequent read operation within another system. This occurs as a result of the fact that the maximum edge-to-edge track skew may have doubled and the clock cannot start clock acquisition until the track logic has determined that all tracks have entered the acquisition burst sequence. Thus, the greater the track skew the more difficult validation of an acquisition burst sequence becomes since the detection of an acquisition burst sequence will occur further into the acquisition burst sequence of the early tracks in an area of the acquisition burst sequence not previously examined during the writing of the burst for acceptable quality. As a result, the readability of a data block which has just been written will be degraded if that portion of the acquisition burst sequence which occurs following the nominal acquisition interval is defective.

It should therefore be obvious that a need exists for a method and system wherein an acquisition burst sequence may be successfully validated despite increased track skew without requiring a perfect acquisition burst sequence for each track.

SUMMARY OF THE INVENTION

It is therefore an object of the present invention to provide an improved data storage system.

It is another object of the present invention to provide an improved method and system for validation of an acquisition burst sequence which precedes or follows a data block in a data storage system.

It is yet another object of the present invention to provide an improved method and system for validation of an acquisition burst sequence within a data storage system which is tolerant of increased track skew.

The foregoing objects are achieved as is now described. A method and system are disclosed for detecting and validating multibit acquisition burst sequences which precede and follow each data block in a multitrack data storage system. An acquisition sequence pattern detection circuit is utilized to provide an indication of acquisition burst sequence detection in response to an occurrence of an accurate sequence of a selected number of acquisition burst sequence bits. A latch is utilized to store the pattern criteria indication for each associated track and the latch outputs are then combined in a logic circuit to provide a composite burst pattern error indication signal. An acquisition burst sequence quality detection circuit is also utilized to provide a quality criteria indication for each track in response to an occurrence of an accurate sequence of a larger number of acquisition burst sequence bits than is normally required for acquisition which ensures that subsequent detection of the acquisition burst sequence will be successful, despite increased skew among the multiple tracks. An occurrence of an acquisition burst sequence is then validated during selected modes of operation only in response to a detection of an acquisition burst sequence and an indication of sufficient quality of the acquisition burst sequence within a predetermined number of tracks.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
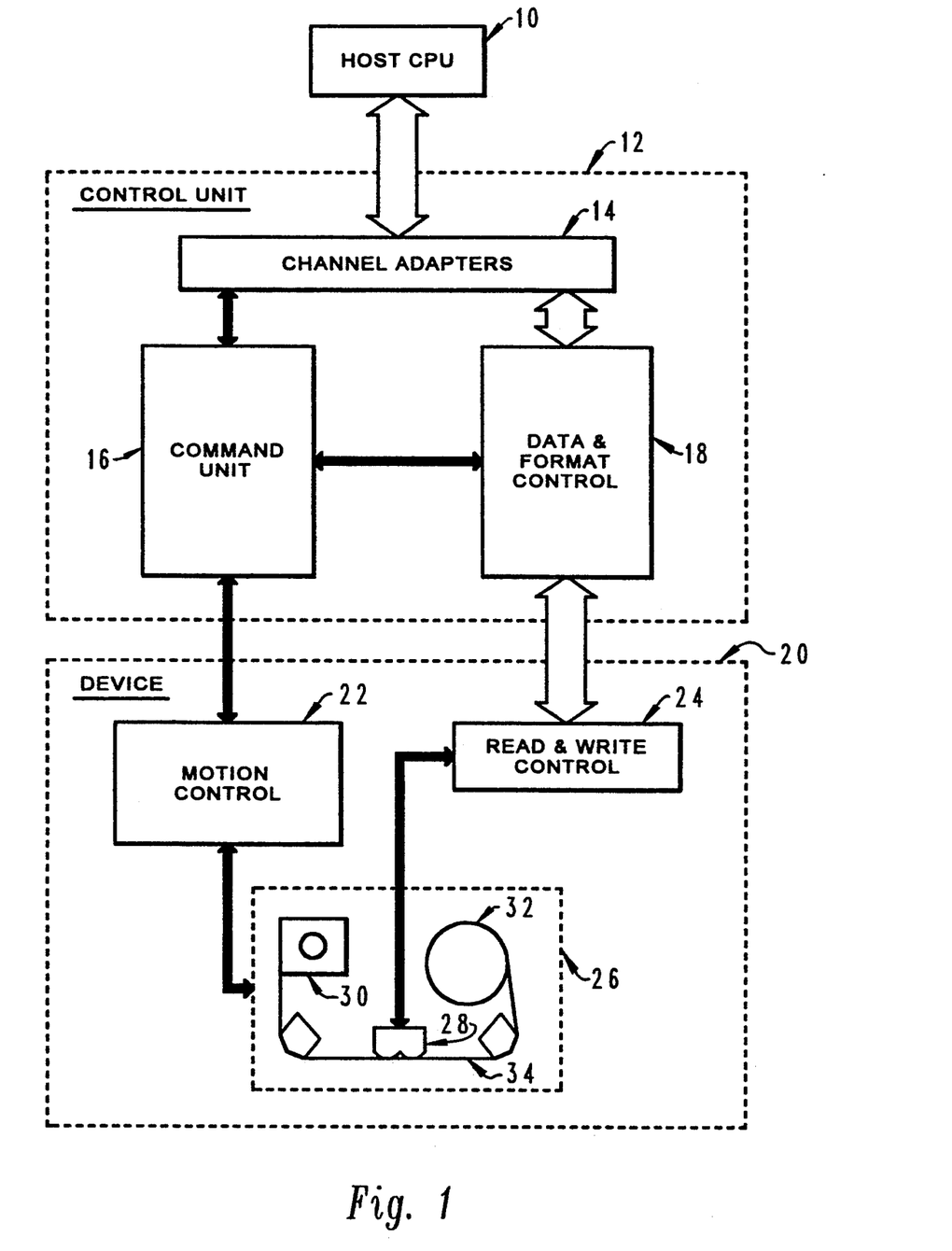
FIG. 1 is a schematic representation of a data storage system which may be utilized with the method and system of the present invention.

With reference now to the figures and in particular with reference to FIG. 1, there is depicted a schematic representation of a data storage system which may be utilized with the method and system of the present invention. As illustrated, a data processing system having a host central processing unit 10 coupled to one or more storage systems. Such storage systems may be implemented utilizing a tape storage system such as the International Business Machines Model No. 3480, 3490, or 3490E Magnetic Tape System. For ease of illustration, a single host CPU and tape storage system are depicted within FIG. 1. As illustrated, host central processing unit 10 is coupled to control unit 12 and at least one magnetic tape recording for playback device 20, and controls such devices accordingly.

As illustrated, control unit 12 includes a command unit 16 which is coupled, via channel adapters 14, to host central processing unit 10, in order to accept commands from host central processing unit 10 to control the mechanical operation of storage device 20. Command unit 16 also preferably controls the flow of data between channel adapters 14 and tape 34, via data and format control 18 and read and write control 24.

As illustrated within FIG. 1, tape storage device 20 preferably includes motion control 22, for controlling the handling of magnetic tape media, and read and write control 24, which includes both read and write circuits for operating on a magnetic transducing head 28 within tape path 26. Tape path 26 preferably includes a tape cartridge 30 having a tape supply reel therein and a tape take-up reel 32. Well known motors and control systems may be utilized for transporting magnetic tape 34 past head 28 for writing data to and reading data from tape 34. The location and quality of an acquisition burst sequence within the data, in accordance with the method and system of the present invention, is accomplished utilizing both a pattern detection circuit and a quality detection circuit which are contained within data and format control 18 and which will be explained in greater detail herein.

Figure 2:
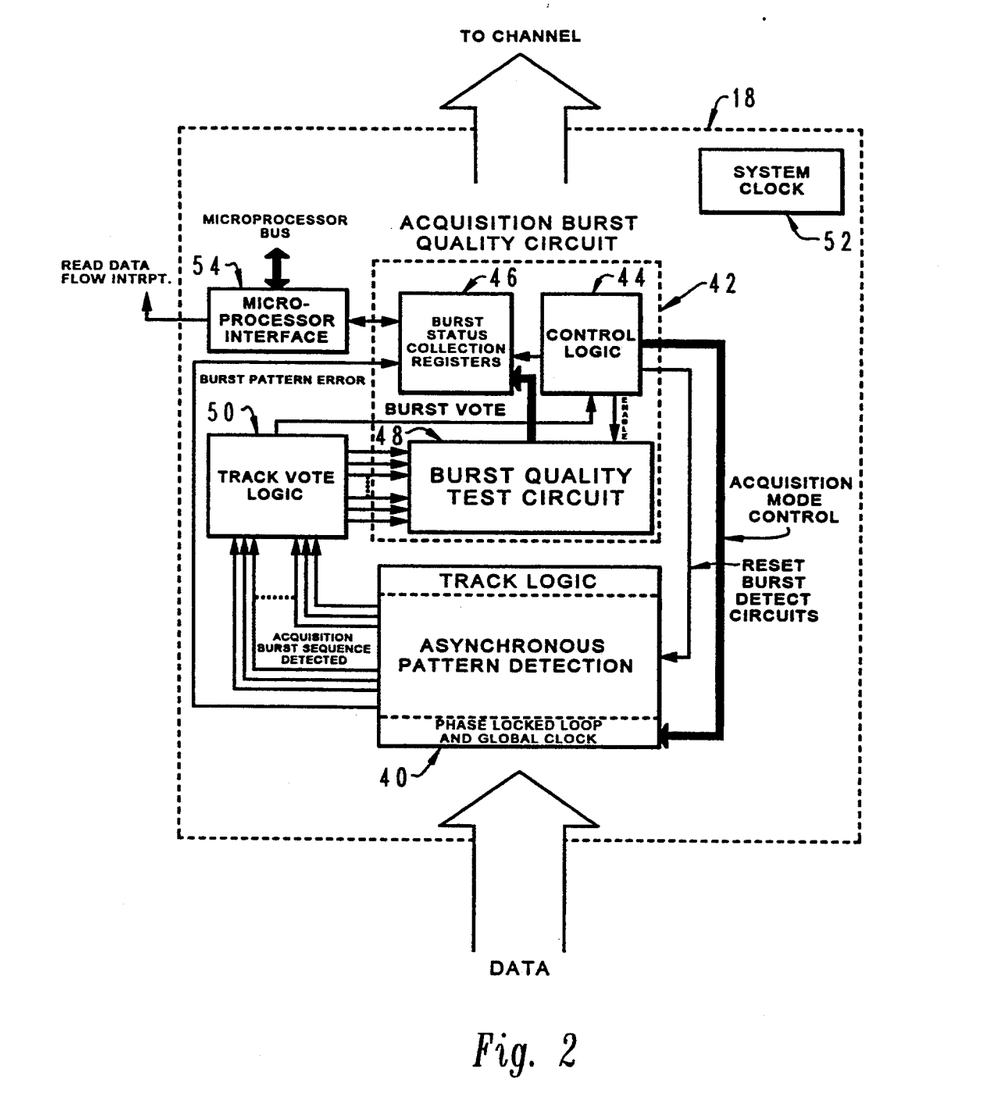
FIG. 2 is a high level block diagram of the data and format control circuitry of the data storage system of FIG. 1.

Referring now to FIG. 2, there is depicted a high level block diagram of data and format control circuit 18 of the data storage system of FIG. 1. As illustrated, data coupled from tape 34 are detected, via read and write control 24, at track logic 40. Track logic 40 includes Phase Locked Loop (PLL) and global clock circuitry which is utilized to lock individual track clocks to an acquisition burst sequence during an acquisition period which is utilized to permit each individual track to acquire bit synchronization for data on that track. The detection of an acquisition burst sequence is accomplished utilizing asynchronous pattern detection circuitry within track logic 40 and, in a manner well known to those having ordinary skill in the art, the detection of an acquisition burst sequence by individual tracks is coupled to track vote logic 50, which is utilized to generate an indication that an acquisition burst sequence has been detected. An acquisition burst sequence is typically a repeating pattern of bytes which, when modulated and adjusted, produces a unique repeating pattern of bits which is recognized within data and format control circuit 18 as an acquisition burst sequence.

Once an interblock gap (IBG) has been detected the system begins to attempt to detect an acquisition burst sequence. The acquisition burst sequence detection circuits are reset and detection of an acquisition sequence burst is initiated along with an acquisition burst sequence pattern validation test. This test is accomplished by presetting a pattern error latch associated with each track and thereafter resetting that latch only in response to an occurrence of an accurate sequence of acquisition burst sequence pattern which is substantially greater than the number of intervals required for detection. The outputs of each of these latches is then combined logically to form a composite burst error indication signal which indicates the absence of a sufficient quantity of acquisition burst sequence accurate patterns near the detection of the acquisition burst sequence for future detection purposes.

Next, in accordance with an important feature of the present invention, once detection of an acquisition burst sequence has occurred with respect to a predetermined number of the total number of tracks, a timer is started which has a period of duration designed to permit all tracks to be well within the acquisition burst sequence. Thereafter, after achieving a one hundred percent burst vote from track vote logic 50, or upon the expiration of this timer, a burst quality test is performed utilizing burst quality test circuit 48. Acquisition burst sequence quality is determined by presetting a detection latch for each track within the system and thereafter resetting those latches only in response to an occurrence of an error in a sequence of a selected number of acquisition burst sequence intervals.

As will be explained in greater detail herein, when engaged in a Read While Write (RWW) operation it is imperative that the quality of the acquisition burst sequence be high in order to avoid acquisition burst sequence errors which may occur as a result of interchange of the storage medium or degradation of the data stored therein. Therefore, in accordance with an important feature of the present invention, the quality of the acquisition burst sequence is determined for a period of time beyond that period normally required for acquisition. This extended period of time is calculated such that the quality of the acquisition burst sequence may be ascertained within each track in that area of the acquisition burst sequence which may not be utilized during a Read While Write (RWW) operation, but which may be subsequently utilized for acquisition as a result of increased skew among tracks which occurs due to interchange of the storage medium.

Thus, an acquisition burst sequence, once detected, is tested both for the existence of a segment of accurate burst sequence pattern which occurs immediately following detection of the acquisition burst sequence and also for the quality of the acquisition burst sequence pattern for a longer period of time than normally required for acquisition on a per track basis, such that burst quality status may be examined and possibly utilized to direct error recovery or rewrite procedures. The outputs of individual track error latches are also then logically combined to form a composite burst error signal which indicates that all tracks satisfy the threshold criterion necessary to avoid a burst error. This burst error signal, along with the individual track outputs of burst quality test circuit 48, are then stored within burst status collection registers 46.

As illustrated within FIG. 2, a microprocessor interface 54 is utilized to couple the acquisition burst quality circuit to the command unit and a read data flow interrupt line is provided which directs the accessing of this burst status information within burst status collection registers 46 during the interblock gap (IBG) which occurs between adjacent data blocks.

Control logic 44 is provided within FIG. 2 and serves, in conjunction with system clock 52, to control the initiation and termination of the various timing periods which are utilized in order to determine the quality of an acquisition burst sequence in a manner described herein. Additionally, as will be described in greater detail herein, in storage formats in which the acquisition burst sequence is present in a symmetrical fashion following each data block, this so-called "ending" burst sequence may also be examined for quality and, in systems which permit data to be read in a reverse direction, utilized to acquire bit synchronization for a backward read operation, in the event the acquisition burst sequence is not available or not of sufficient quality.

Figure 3:
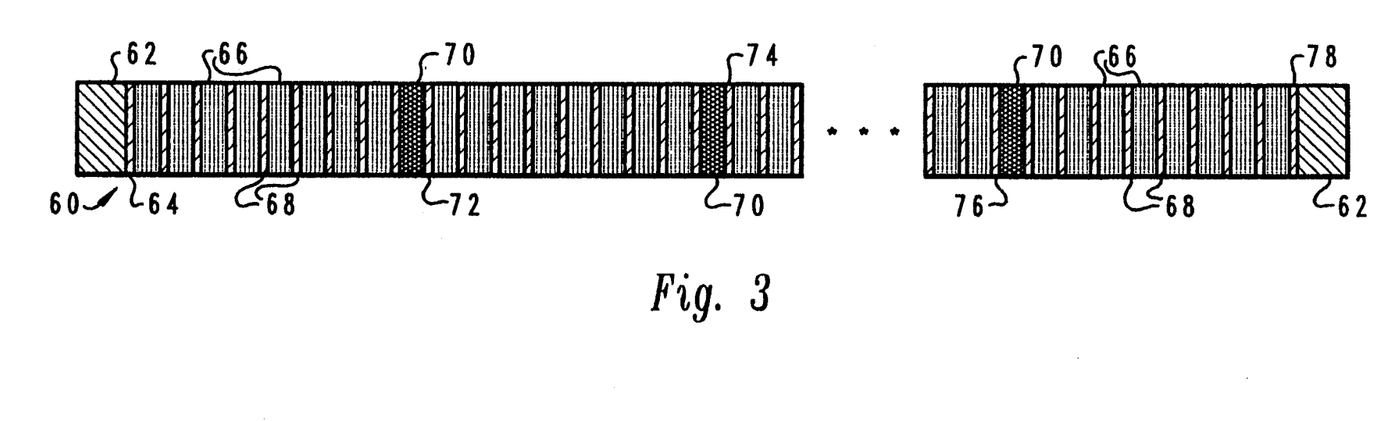
FIG. 3 is a pictorial representation of a tape data format which may be utilized with the method and system of the present invention.

With reference now to FIG. 3, there is depicted a pictorial representation of a tape data format which may be utilized with the method and system of the present invention. A data block 60 is illustrated which includes an acquisition burst sequence 62 which follows an interblock gap character (not shown). In accordance with the particular format depicted within FIG. 3, as will be described herein, each of the bursts and synchronization characters within data block 60 is symmetrical with respect to its position within the data block, such that the data may be read in either a forward or reverse direction. Thus, acquisition burst sequence 62 is present at the beginning of data block 60 and again at the end of data block 60.

Following acquisition burst sequence 62 is a unique synchronization character, forward synchronization character FSC1 (FSC1) which is utilized to indicate the beginning of data. Thereafter, eight data segments 66 follow, each separated by a common resynchronization character 68. Next, a resynchronization burst 70 is provided to allow individual track read clocks to reacquire bit synchronization within a physical block. Since these resynchronization bursts 70 are designed to permit individual tracks to resynchronize, there is no requirement that all tracks read these resynchronization bursts simultaneously. Thus, resynchronization burst 70 is typically a shorter pattern than acquisition burst sequence 62. As illustrated, each resynchronization burst 70 is followed by a Forward Synchronization Character and preceded by a Backward Synchronization Character.

Next, a second unique synchronization character, Forward Synchronization Character 2 (FSC2) 72 occurs following resynchronization burst 70. Similarly, a third unique synchronization character, Forward Synchronization Character 3 (FSC3) 74 follows the next resynchronization burst 70. In the depicted embodiment of the present invention up to five unique Forward Synchronization Characters are defined in a manner which supports the ability of the system to read data in both the forward and backward direction. These five unique Forward Synchronization Characters and five unique Backward Synchronization Characters provide information regarding the proximity of the beginning or end of a physical block of data. The Backward Synchronization Characters, as will be explained herein, are numbered beginning at the end of a physical block and are each defined to be the exact inverse of the corresponding Forward Synchronization Character.

As a result, the exact same sequence of synchronization characters will be detected within a data block regardless of the direction in which the physical block is read. Additionally, a determination of relative position within the physical data block may be determined by determining the particular synchronization character being read. Thus, if one of the aforementioned unique Forward Synchronization Characters is being read, the reader is near the beginning of a data block. Similarly, if one of the unique Backward Synchronization Characters is being read, the reader is near the end of a physical block. This relationship is true regardless of the direction in which the block is being read as a result of the inverse nature of these synchronization characters.

Thus, at the end of data block 60, a unique Backward Synchronization Character 2 (BSC2) 76 is provided adjacent to resynchronization burst 70. Similarly, Backward Synchronization Character 1 (BSC1) 78 is provided immediately preceding acquisition burst sequence 62. Thus, it may be seen that these unique synchronization characters may be utilized to determine the relative position of the reader within the data block with respect to either end of the data block. Of course, the relative size of a data block in a system which permits variably sized data blocks may accommodate a greater or lesser number of such unique synchronization characters; however, each data block will include at least a single unique Forward Synchronization Character and a single Backward Synchronization Character.

Figure 4A:
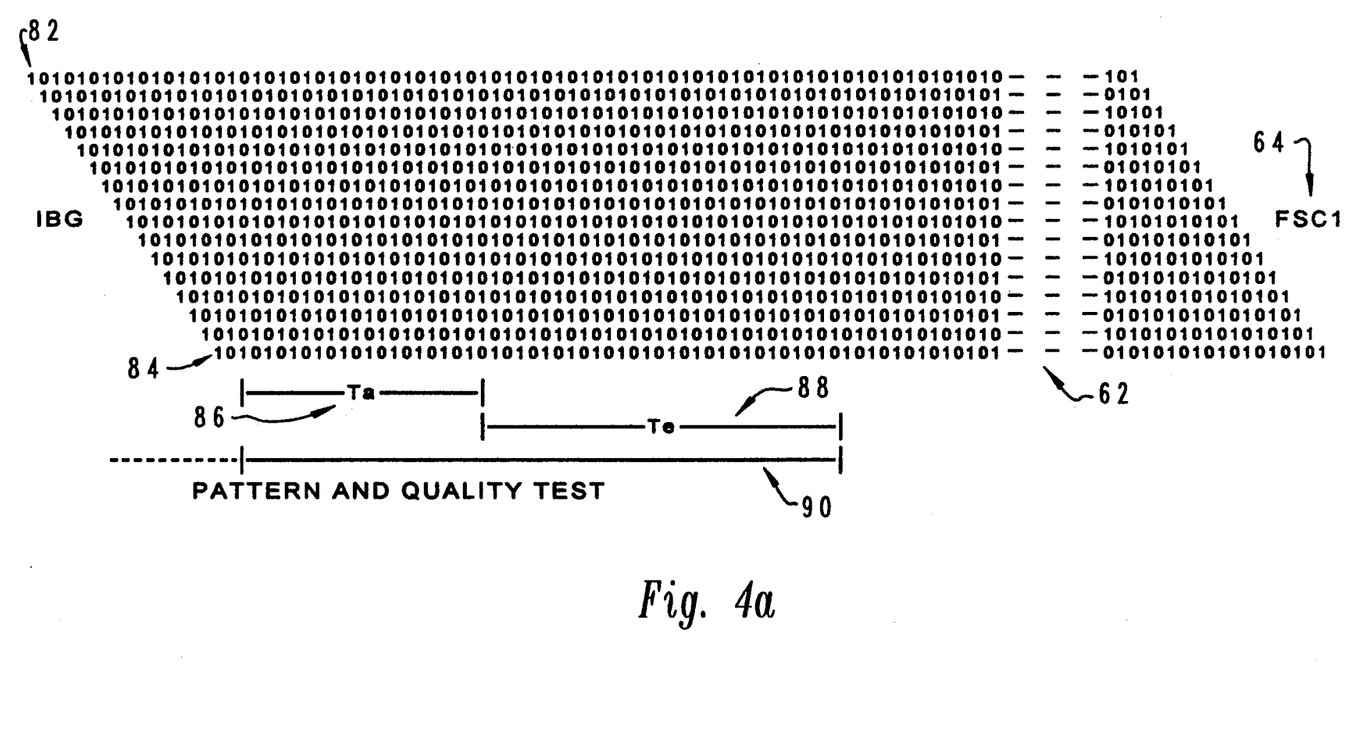
FIGS. 4a and 4b illustrate pictorially the effect of track skew in a data storage system which may be accommodated utilizing the method and system of the present invention.
Figure 4B:
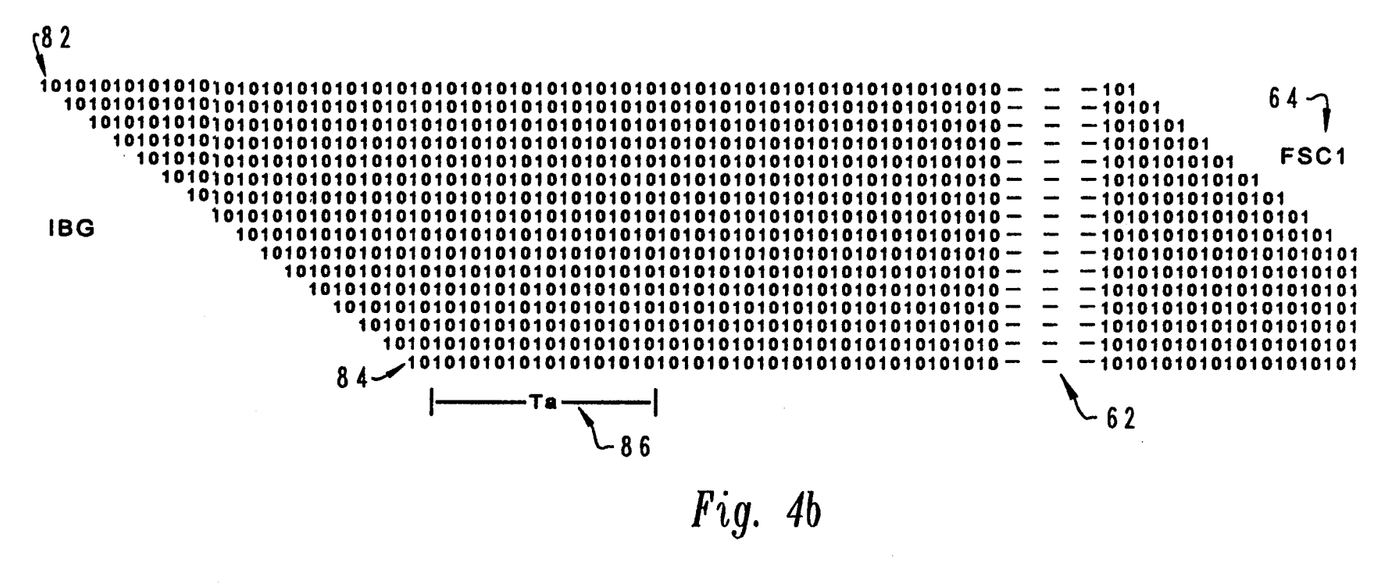

Referring now to FIGS. 4a and 4b, there is illustrated a pictorial representation of the effect of track skew in a data storage system which may be accommodated utilizing the method and system of the present invention. Referring first to FIG. 4a, an acquisition burst sequence 62 is illustrated in pictorial form as a series of 1's and O's. As described above with respect to FIG. 3, this acquisition burst sequence follows an interblock gap (IBG) and, in the depicted embodiment of FIG. 4a, includes sixteen separate tracks. As illustrated, track "skew" is permitted in this system such that those tracks located near reference numeral 82 will be read prior to those tracks located near reference numeral 84. Additionally, as described above with respect to FIG. 3, the acquisition burst sequence is followed by a Forward Synchronization Character (FSC1), as illustrated at reference numeral 64.

Still referring to FIG. 4a, as illustrated, the acquisition burst sequence is detected at transducing head 28 initially within those tracks nearest reference numeral 82. After a sufficient time has elapsed such that all tracks are assumed to be reading an acquisition burst sequence, an acquisition timer "Ta" is initiated, as depicted at reference numeral 86. This period of time represents that period which follows detection of an acquisition burst sequence by a specified number of the multiple tracks within a multiple track recording system and it is during this period of time that acquisition of bit synchronization takes place utilizing the Phase Locked Loop (PLL) circuitry of track logic 40 (see FIG. 2).

Upon the expiration of this acquisition time period "Ta," an extended time period "Te" is initiated, as illustrated at reference numeral 88. This extended time period represents that portion of the acquisition burst sequence which may possibly be utilized for acquisition as a result of increased skew among the tracks, as a result of storage medium interchange. In accordance with an important feature of the present invention, a pattern test which indicates that each track includes a segment of high quality acquisition burst sequence signal following detection of the acquisition burst is combined with a acquisition burst sequence quality test which determines the quality of the acquisition burst sequence signal throughout acquisition period "Ta" and extended period "Te," such that a subsequent detection of the acquisition burst sequence may be successfully accomplished despite increased skew which may occur among the multiple tracks. As described above, the results of the pattern test and quality test are then stored within burst status collection registers 46 (see FIG. 2) and may thereafter be utilized, when accessed by a command unit to control or invoke error recovery procedures or rewrite procedures.

Referring now to FIG. 4b, the effect of increased skew among the tracks may be illustrated. As depicted within FIG. 4b, the skew among related tracks has doubled from the maximum permitted skew illustrated within FIG. 4a. This, as those skilled in the art will appreciate, may occur as a result of two data storage system having the maximum permitted skew in opposite directions. Thus, the initiation of the acquisition burst sequence within reference numeral 84 will not occur until a substantially greater period of time has elapsed following detection of the acquisition burst sequence at the tracks located near reference numeral 82.

Thereafter, as illustrated at reference numeral 86, the period of time during which acquisition will occur utilizing Phase Locked Loop (PLL) circuitry of track logic 40 will be somewhat delayed. This occurs, as described above, due to the fact that acquisition for bit synchronization purposes will not occur until all tracks have entered the acquisition burst sequence. Thus, when referring to FIGS. 4a and 4b together, it may be seen that the provision of an enhanced quality test for a selected sequence of bits beyond that normally utilized for acquisition may be utilized to ensure that successful acquisition and bit synchronization will occur, despite an increase in skew among the tracks in a multitrack recording system.

Figure 5:
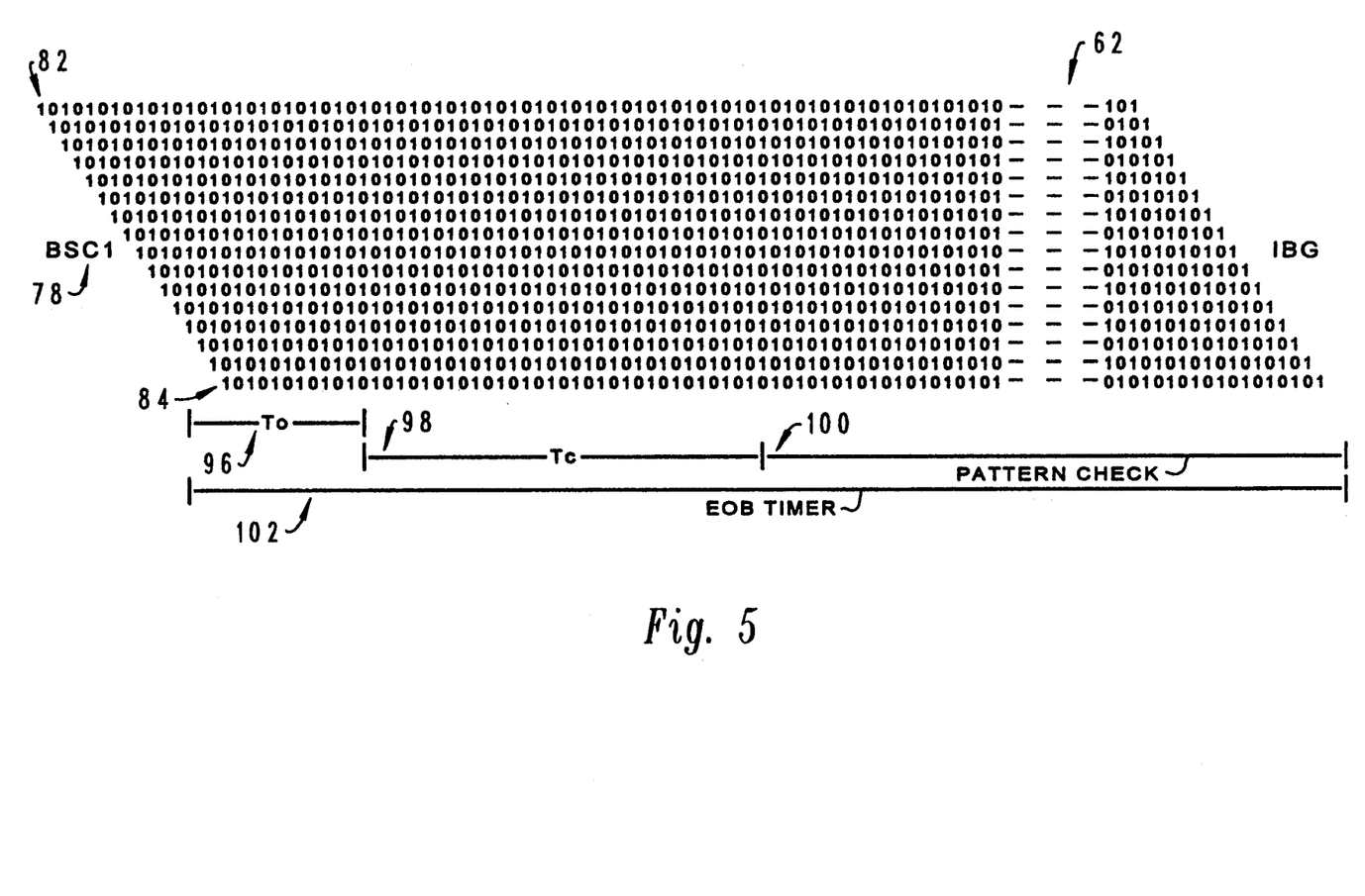
FIG. 5 illustrates pictorially the validation of an ending burst sequence in accordance with the method and system of the present invention.

With reference now to FIG. 5, there is illustrated pictorially the validation of an ending burst sequence which may be accomplished in accordance with the method and system of the present invention. As described with respect to FIG. 3 above, the last Backward Synchronization Character (BSC1), as indicated at reference numeral 78, precedes the ending burst sequence in a storage system utilizing the format described with respect to FIG. 3. Next, an opening time delay "To" and an End Of Block (EOB) timer are initiated, as depicted at reference numerals 96 and 102 respectively. Opening time delay "To" is utilized to ensure that all tracks within the system are within the ending burst sequence. The End Of Block (EOB) timer, as depicted at block 102, is utilized to ensure that the location of the subsequent Interblock Gap (IBG) is successfully determined so that additional data may be appended to the records within the storage medium. This timer is typically driven by a detection of the last Backward Synchronization Character (BSC1) by a selected number of the tracks and serves to locate the next Interblock Gap (IBG).

Next, in accordance with an important feature of the present invention, the expiration of the time delay "To" results in the initiation of a second delay period "Tc," as depicted at reference numeral 98. This time period is utilized to initiate a burst quality test in a manner similar to that described with respect to the processing of the acquisition burst sequence and this delay period is calculated such that the quality of the ending burst sequence may be ascertained during that period of time which may be utilized for acquisition in a backward read operation in the presence of increased skew.

Thereafter, upon the expiration of this time period, as illustrated at reference numeral 100, a pattern check is initiated. This pattern check, in a manner similar to that described with respect to the processing of the acquisition burst sequence, is utilized to ensure that each track includes a sufficient interval of high quality ending burst sequence signal immediately adjacent to the Interblock Gap (IBG), for utilization in detection during a backward read operation. This pattern check is halted following the expiration of the End Of Block (EOB) timer delay, as illustrated at block 102. Thereafter, a composite burst error signal and the individual quality test results are sampled and stored within burst status collection registers 46 (see FIG. 2) in a manner similar to that described with respect to the processing of the acquisition burst sequence.

Figure 6:
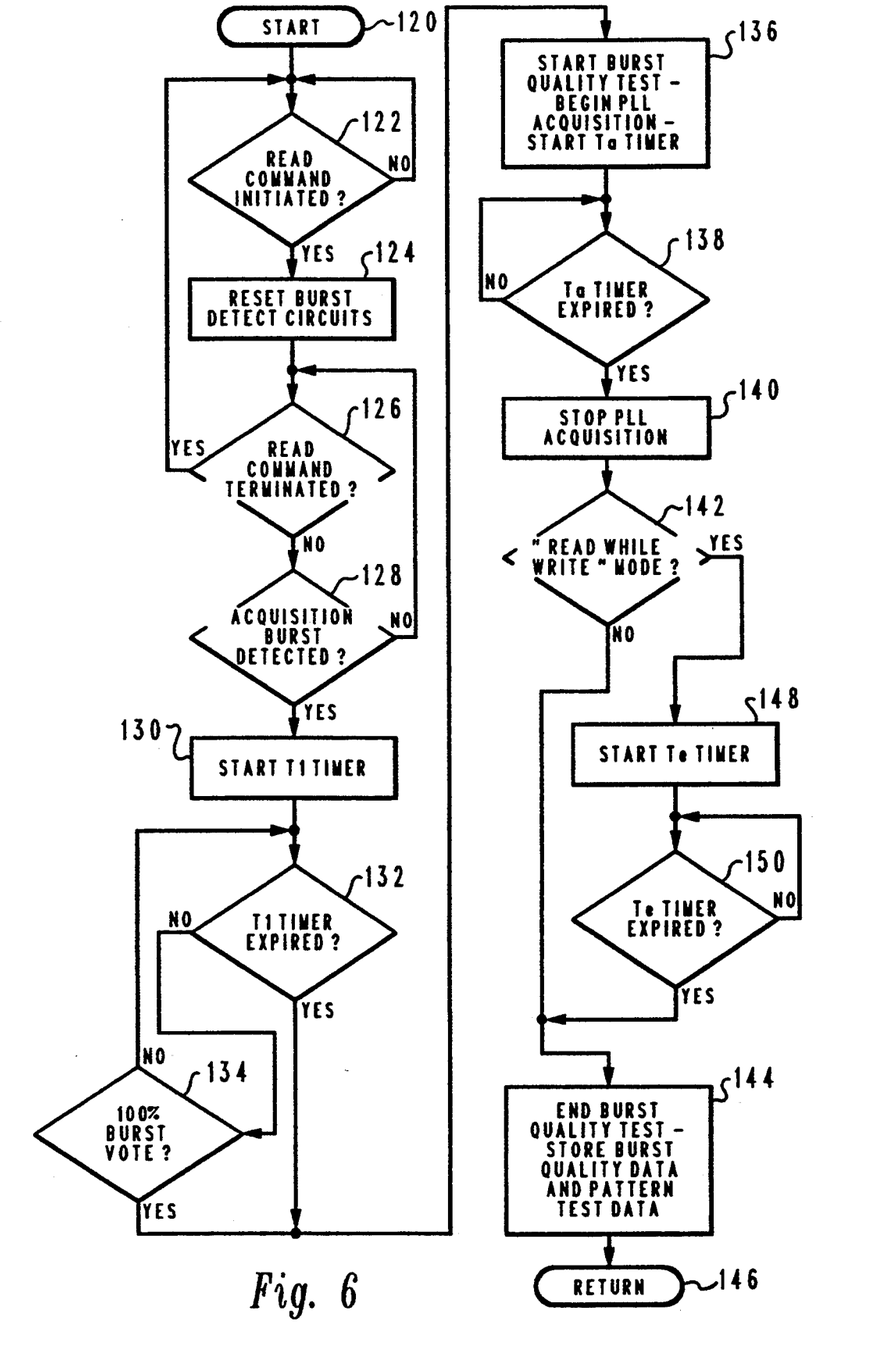
FIG. 6 is a high level logic flowchart illustrating the method of the present invention for acquisition burst sequence validation.

Referring now to FIG. 6, there is illustrated a high level flowchart which depicts the method of the present invention for acquisition burst sequence detection. As illustrated, the process begins at block 120 and thereafter passes to block 122. Block 122 illustrates a determination of whether or not a Read command has been initiated. If not, the process merely iterates until such time as a Read command has been initiated. Once a Read command has been initiated, the process passes to block 124 which depicts the resetting of the burst detect circuits. This is accomplished utilizing control logic 44, as depicted within FIG. 2.

Next, the process passes to block 126. Block 126 illustrates a determination of whether or not the Read command has been terminated and if so, the process returns, in an iterative fashion, to block 122 to await the initiation of a subsequent Read command. Alternately, in the event the Read command has not been terminated, the process passes to block 128. Block 128 illustrates a determination of whether or not an acquisition burst sequence has been detected. In the event an acquisition burst sequence has not been detected, the process returns to block 126, in an iterative fashion, to await termination of the read command or the detection of an acquisition burst sequence.

Still referring to block 128, once an acquisition burst sequence has been detected, the process passes to block 130. Block 130 illustrates the starting of a so-called "T1" timer. The "T1" timer is utilized to ensure that all tracks within the system are within the acquisition burst sequence, once an acquisition burst sequence has been detected. Thereafter, the process passes to block 132. Block 132 illustrates a determination of whether or not the "T1" timer has expired and if not, the process passes to block 134. Block 134 illustrates a determination of whether or not one hundred percent of the tracks within a multitrack data storage system have recorded detection of an acquisition burst sequence. If not, the process returns to block 132, in an iterative fashion.

Upon the expiration of the "T1" timer, or the occurrence of a one hundred percent acquisition burst sequence detection vote, the process passes to block 138. Block 136 illustrates the starting of the burst quality test and the beginning of Phase Locked Loop (PLL) acquisition. The acquisition timer "Ta" is also initiated. Next, the process passes to block 138. Block 138 illustrates a determination of whether or not the acquisition timer "Ta" has expired and if not, the process merely iterates until such time as this timer has expired.

Still referring to block 138, once the acquisition timer "Ta" has expired, the process passes to block 140. Block 140 illustrates the stopping of the Phase Locked Loop (PLL) acquisition and the process then passes to block 142. Block 142 illustrates a determination of whether or not the Read command which was initiated was a Read While Write (RWW) command and if not, the process passes to block 144 which illustrates the ending of the burst quality test and the storing of the burst quality data and pattern test data. The process then passes to block 146 and returns to await the initiation of a subsequent Read command.

Referring again to block 142, in the event the Read command which was initiated was a Read While Write (RWW) command, the process passes to block 148. Block 148 illustrates the starting of the extended timer Te in order to permit the quality of the acquisition burst sequence to be sampled during that portion of the acquisition burst sequence which may be utilized for acquisition in a subsequent read, due to increased skew among the tracks. The process then passes to block 150 which illustrates a determination of whether or not the extended timer "Te" has expired and if not, the process merely iterates. Once the extended timer "Te" has expired, the process passes from block 150 to block 144 which, as described above, illustrates the ending of the burst quality test and the storing of the burst quality data and pattern test data. The process then passes to block 146 and returns.

As described herein, those skilled in the art will appreciate that the Applicants have presented an acquisition burst sequence detection and quality assessment system which permits the quality of individual tracks within an acquisition burst sequence in a multitrack data storage system to be assessed and utilized for possible error recovery or rewrite initiation purposes. Further, by determining the maximum permitted skew among multiple tracks within such a system, the quality of an acquisition burst sequence pattern may be examined during an extended period of time which covers that portion of the acquisition burst sequence which may possibly be utilized for acquisition, as a result of increased skew among the tracks. In this manner, the quality and accuracy of the acquisition burst sequence may be rapidly and efficiently determined, resulting in an increased efficiency within a data storage system.

Figure 7:
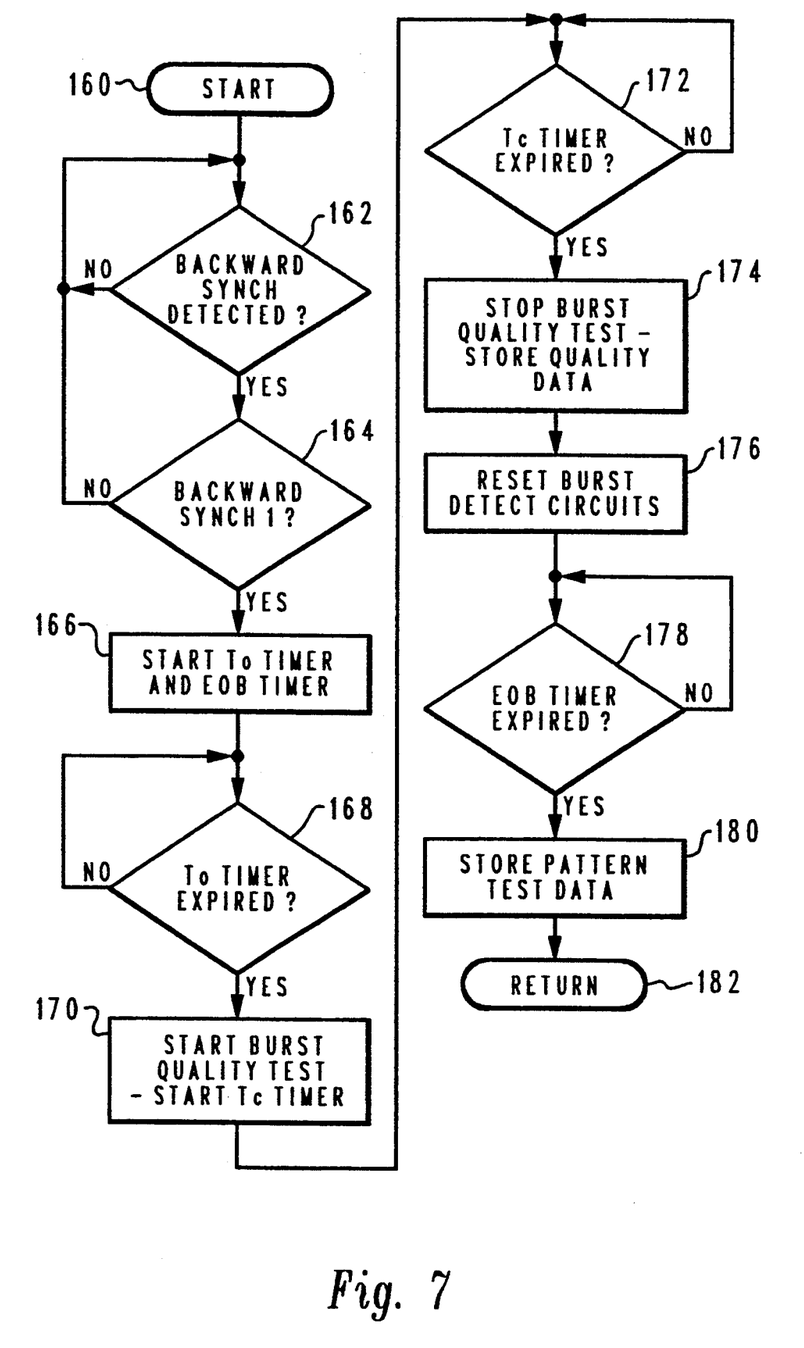
FIG. 7 is a high level logic flowchart illustrating the method of the present invention for ending burst sequence validation.

Finally, referring to FIG. 7, there is illustrated a high level logic flowchart which depicts the method of the present invention for ending burst sequence detection. As illustrated, the process begins at block 160 and thereafter passes to block 162. Block 162 illustrates a determination of whether or not a Backward Synchronization Character has been detected and if not, the process merely iterates until such time as a Backward Synchronization Character is detected. Next, once a Backward Synchronization Character as been detected, the process passes to block 164. Block 164 illustrates a determination of whether or not the Backward Synchronization Character which has been detected is Backward Synchronization Character 1 (BSC1). If not, the process again iterates to await the detection of Backward Synchronization Character 1 (BSC1).

Still referring to block 164, once Backward Synchronization Character 1 (BSC1) has been detected, the process passes to block 166. Block 166 illustrates the starting of the opening time delay "To" and the End Of Block (EOB) timer. Thereafter, the process passes to block 168. Block 168 illustrates a determination of whether or not the opening time delay "To" has expired, indicating that all tracks should have acquired the ending synchronization burst. Once this time delay has expired, the process passes to block 170. Block 170 illustrates the starting of the burst quality test and the starting of the "Tc" timer. As described above, this timer is utilized to initiate the quality test of that portion of the ending burst sequence which may be utilized for acquisition during a backward read operation, as a result of increased skew among the tracks. Once the "Tc" timer has expired, the process will pass from block 172 to block 174.

Block 174 illustrates the stopping of the burst quality test and the storing of the burst quality data for each individual track within the data storage system, as described above. Thereafter, the process passes to block 176 which illustrates the resetting of the burst detect circuits. Next, the process passes to block 178 which illustrates a determination of whether or not the End Of Block (EOB) timer has expired and if not, the process merely iterates until such time as this timer has expired. Once the End Of Block (EOB) timer has expired, the process passes to block 180. Block 180 illustrates the storing of the pattern test data and the process then passes to block 182 and returns.

Upon reference to the foregoing those skilled in the art will appreciate that the ending burst sequence may be carefully and efficiently examined utilizing the method and system of the present invention to ensure that the pattern of the ending burst sequence is sufficiently accurate adjacent to the interblock gap such that acquisition may occur during a backward read operation. Additionally, the quality of the ending burst sequence may be examined for a period of time which follows an estimated acquisition period during a backward read operation to ensure that the individual track quality is sufficiently high such that acquisition may occur despite increased skew among the tracks.

While the invention has been particularly shown and described with reference to a preferred embodiment, it will be understood by those skilled in the art that various changes in form and detail may be made therein without departing from the spirit and scope of the invention.

We claim:

1. A storage system for accurately storing and reading data stored as multiple data blocks within multiple skewed tracks on a removable storage medium mounted therein wherein each data block is preceded by a multibit acquisition sequence for clock synchronization purposes, said storage system comprising:
   a transducing head;
   means for moving said removable data storage medium relative to said transducing head;
   means for controlling said transducing head to store and read data on said removable data storage medium;
   acquisition sequence pattern detection means coupled to said transducing head for indicating detection of said multibit acquisition sequence in response to an occurrence of an accurate sequence of a first selected number of bits of said multibit acquisition sequence within each of said multiple tracks;
   acquisition sequence quality determination means coupled to said transducing head for generating a quality indication for each of said multiple tracks for a period of time exceeding normal acquisition requirements wherein successful subsequent detection of said multibit acquisition sequence may occur despite increased skew among said multiple tracks; and
   control logic means coupled to said acquisition sequence pattern detection means and said acquisition sequence quality determination means for validating an occurrence of a multibit acquisition sequence in response to both a detection of said multibit acquisition sequence and generation of a quality indication for a particular number of said multiple tracks wherein accurate clock synchronization may occur.

2. The storage system for accurately storing or reading data according to claim 1, wherein said storage system stores and reads data within sixteen tracks simultaneously and wherein said acquisition sequence pattern detection means indicates detection of said multibit acquisition sequence in response to an occurrence of a sequence of a first selected number of bits of said multibit acquisition sequence within twelve of said sixteen tracks.

3. The storage system for accurately storing or reading data according to claim 2, wherein said control logic means validates occurrence of a multibit acquisition sequence in response to a detection of said multibit acquisition sequence and generation of a quality indication for all sixteen of said multiple tracks.

4. The storage system for accurately storing or reading data according to claim 1, wherein said acquisition sequence quality determination means includes a latch associated with each of said multiple tracks for latching said quality indication in response to generation thereof.

5. The storage system for accurately storing or reading data according to claim 4, wherein said acquisition sequence pattern detection means includes a pattern latch associated with each of said multiple tracks and means for altering a state of each pattern latch in response to an occurrence of an accurate sequence of a first selected number of bits of said multibit acquisition sequence, wherein said first selected number exceeds normal detection requirements.

6. The storage system for accurately storing or reading data according to claim 5, wherein an output of each pattern latch associated with each of said multiple tracks is coupled to a logic circuit for combining each output into a single burst pattern error indication signal.

7. The storage system for accurately storing or reading data according to claim 6, wherein said control logic means is coupled to an output of said logic circuit.

8. The storage system for accurately storing or reading data according to claim 1, wherein each data block is followed by a multibit ending acquisition sequence and wherein said acquisition sequence pattern detection means indicates detection of said multibit ending acquisition sequence in response to an occurrence of a sequence of a first selected number of bits of said multibit ending acquisition sequence within a predetermined number of said multiple tracks.

9. A method for accurately storing and reading data stored as multiple data blocks within multiple skewed tracks on a removable storage medium within a data storage system wherein each data block is preceded by a multibit acquisition sequence for clock synchronization purposes, said method comprising the steps of:
   reading data on said removable storage medium;
   detecting said multibit acquisition sequence in response to an occurrence of an acquisition sequence of a first selected number of bits of said multibit acquisition sequence within each of said multiple tracks;
   generating a quality indication for each of said multiple tracks for a period of time exceeding normal acquisition requirements wherein successful subsequent detection of said multibit acquisition sequence may occur despite increased skew among said multiple tracks; and
   validating an occurrence of a multibit acquisition sequence in response to both a detection of said multibit acquisition sequence and generation of a quality indication for a particular number of said multiple tracks wherein accurate clock synchronization may occur.

* * * * *